UNITED STATES PATENT OFFICE.

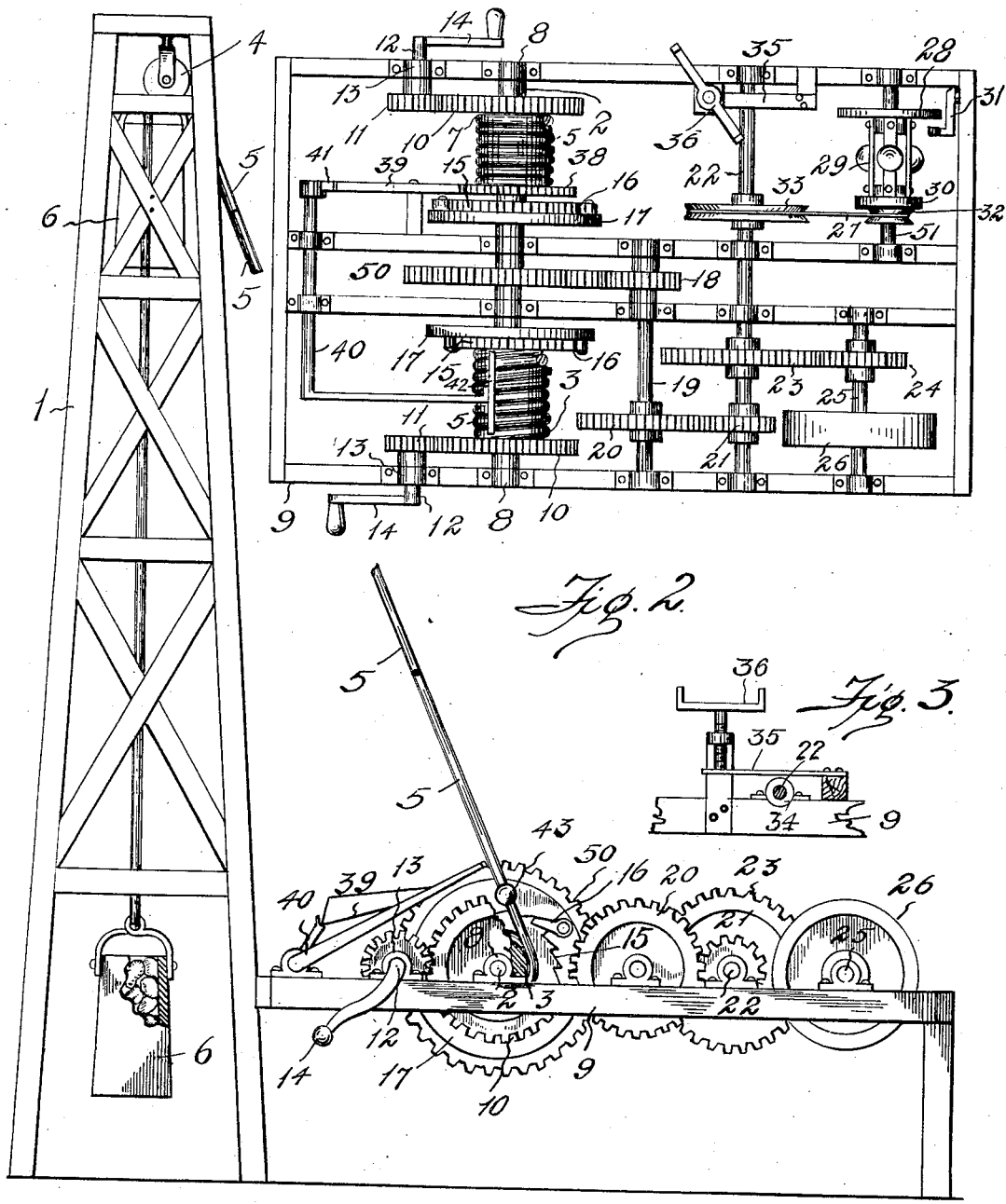

JAMES A. WILSON, OF MAHOMET, TEXAS.

WEIGHT-MOTOR.

961,279.   Specification of Letters Patent.   Patented June 14, 1910.

Application filed November 28, 1908. Serial No. 464,934.

*To all whom it may concern:*

Be it known that I, JAMES A. WILSON, citizen of the United States, residing at Mahomet, in the county of Burnet and State of Texas, have invented certain new and useful Improvements in Weight-Motors, of which the following is a specification.

My invention relates to new and useful improvements in weight motors.

The object of the invention is to provide a simple device of superior construction involving a tower, a weight operated gearing, and a governor including a regulating brake.

Another object is to provide a motor that will furnish power for operating electric dynamos and other machinery, such as grist mills, shellers, hullers, etc., and various other machines and apparatuses.

Finally the object of my invention is to provide a device of the character described that will be strong, durable, simple and efficient and also one in which the several parts will not be liable to get out of working order.

With the above and other objects in view, my invention has particular relation to certain novel features of construction and operation, an example of which is described in the following specification and illustrated in the accompanying drawings, wherein:

Figure 1 is a side elevation of the motor, Fig. 2 is a plan view, the tower being omitted, and Fig. 3 is a detail of the brake.

In the drawings, the numeral 1 designates a tower suitably constructed and of any desired height. At the top of the tower pulleys 4 are mounted. The pulleys being positioned to permit cables or other flexible connections 5, passing over the pulley, to hang in the tower. To the depending end of each cable a weight 6 is attached. The other ends of the cables are attached to drums 3 and 7 about which they are coiled. The drums are loosely mounted on a shaft 2 rotating in bearings 8 resting on a horizontal frame 9 attached to the lower portion of the tower. At one end each drum is provided with a gear 10 which meshes with a winding pinion 11 mounted on a shaft 12 supported in a bearing 13 resting on the frame and having a crank handle 14 fixed on its projecting end.

By turning the handle 14, the drum is revolved, the cable coiled thereon and the weight 6 raised to the top of the tower. For holding each drum and its weight in position, a ratchet 15 is fixed on its opposite end and adapted to be engaged by a pawl 16 carried on the inner side of a disk 17 fixed on the drum shaft. At the center of the shaft 2 a gear 50 meshes with and transmits motion to a train of gears comprising a pinion 18 mounted on a counter shaft 19 mounted on the frame and transmitting motion by a gear 20 to a pinion 21 mounted on a brake shaft 22 also supported on the frame.

The brake shaft has fixed thereon a gear 23 meshing with a pinion 24 fixed on a power shaft 25 mounted on the frame and carrying a pulley 26 by which motion can be transmitted as desired.

On a shaft 51 a speed governor including a brake disk is arranged. The brake disk 28 is movable on the shaft and from it spring weight arms 29 extend, having their ends attached to a collar 30 fixed on the shaft. If the shaft 25 should revolve at too high a rate of speed or the motor attempt to "race" the centrifugal action will bow the arms and draw the sleeve over the shaft until the brake disk engages a brake shoe 31. The governor is driven by a belt 27 extending from a pulley 32 fixed to the collar 30 and passing around a larger pulley 33 fixed on the shaft 22.

For holding the motor against operation a collar 34 is fixed on the shaft 22 and a brake shoe 35 supported from the frame, extended across the same. The free end of the shoe receives the lower end of a hand screw 36 supported in a bracket 37 resting on the frame. It is evident that by turning the hand screw and forcing the shoe 35 into contact with the collar, a braking action is had and the motor stopped irrespective of the position of the weight.

It is understood that as a weight moves downward, the cable is unwound from its drum and the latter revolved, thus imparting motion to the train of gears and pinions and the pulley 26 by means of the gear 50 and the pawl and ratchet. However, only one weight moves at a time. The drum 7 is held against rotation and its weight at the top of the tower, until the drum 3 is unwound and its weight has descended. This is accomplished by means of a ratchet 38 fixed to the drum 7 and engaged by a pawl 39 pivotally supported from the frame. The pawl is enlarged or considerably heavier at its outer end so as to have a tendency to swing down and away from the ratchet. It is held in engagement with the ratchet by a lever 40 mounted to rock on the frame and having a lug 41 engaging under the outer edge of the pawl. This lever has its opposite end projecting over the drum 3 and provided with a cross piece 42 projecting in close proximity to the upward run of the cable.

When the cable is practically unwound from the drum 3, a button 43 thereon engages the cross piece 42 and swings the lever 40 so that the lug 41 is swung up from under the pawl 39 and the latter permitted to swing away from the ratchet 38, thus permitting the drum 7 to unwind and its weight to descend after the drum 3 has unwound and its weight descended.

What I claim, is:

1. In a motor of the character described, a pair of successively operable weight motors including drums provided with cables leading to the weights, and means for preventing rotation of one of the drums until the other has unwound comprising a ratchet on the first mentioned drum, a weighted pivoted pawl 39 engaging therewith, a supporting device 41 engaging the weighted end of said pawl 39 to normally hold the same in elevated position and in engagement with the ratchet, and means controlled by the unwinding of the cable of the last mentioned drum to release the pawl 39 so that the same will disengage from its ratchet.

2. In a motor of the character described, a pair of successively operable weight motors including drums provided with cables leading to the weights, and means for preventing rotation of one of the drums until the other has unwound comprising a ratchet on the first mentioned drum, a pawl adapted to engage therewith, and means for releasing the pawl including a movable part above the coil of the cable on the last mentioned drum arranged to be actuated by said cable, substantially as described.

3. In a motor of the character described, a pair of successively operable weight motors including drums provided with cables leading to the weights, and means for preventing rotation of one of the drums until the other has unwound comprising a ratchet on the first mentioned drum, a pawl adapted to engage therewith, and means for releasing the pawl including a movable part arranged above the coil of the cable on the last mentioned drum, in combination with a device carried by the cable arranged to engage said movable part.

In testimony whereof I have signed my name to this specification in the presence of two subscribing witnesses.

JAMES A. WILSON.

Witnesses:
Jas. Sudbury,
J. G. Sudbury, Sr.